(12) United States Patent
Zheng et al.

(10) Patent No.: US 12,524,591 B2
(45) Date of Patent: Jan. 13, 2026

(54) LIBRARY SCALING FOR CIRCUIT DESIGN ANALYSIS

(71) Applicant: Synopsys, Inc., Mountain View, CA (US)

(72) Inventors: Jianquan Zheng, San Jose, CA (US); Peivand Tehrani, Campbell, CA (US)

(73) Assignee: Synopsys, Inc., Sunnyvale, CA (US)

( * ) Notice: Subject to any disclaimer, the term of this patent is extended or adjusted under 35 U.S.C. 154(b) by 561 days.

(21) Appl. No.: 18/111,263

(22) Filed: Feb. 17, 2023

(65) Prior Publication Data

US 2024/0281581 A1 Aug. 22, 2024

(51) Int. Cl.
| | | |
|---|---|---|
| *G06F 30/323* | (2020.01) | |
| *G06F 30/3312* | (2020.01) | |
| *G06F 30/3315* | (2020.01) | |
| *G06F 30/367* | (2020.01) | |
| *G06F 30/373* | (2020.01) | |
| *G06F 30/398* | (2020.01) | |
| *G06F 119/12* | (2020.01) | |

(52) U.S. Cl.
CPC ........ *G06F 30/3312* (2020.01); *G06F 30/323* (2020.01); *G06F 30/3315* (2020.01); *G06F 30/367* (2020.01); *G06F 30/373* (2020.01); *G06F 30/398* (2020.01); *G06F 2119/12* (2020.01)

(58) Field of Classification Search
CPC .............. G06F 30/3312; G06F 30/323; G06F 30/3315; G06F 30/367; G06F 30/373; G06F 30/398; G06F 2119/12
USPC ................... 716/113, 108, 134, 136; 703/16
See application file for complete search history.

(56) References Cited

U.S. PATENT DOCUMENTS

| | | | | |
|---|---|---|---|---|
| 5,406,497 | A  * | 4/1995 | Altheimer | G06F 30/39 716/108 |
| 8,146,047 | B2 * | 3/2012 | Gregory | G06F 30/3312 716/108 |
| 8,949,764 | B2 * | 2/2015 | Iyer | G06F 30/327 716/132 |
| 2004/0025136 | A1 * | 2/2004 | Carelli, Jr. | G06F 30/367 716/136 |
| 2012/0079441 | A1 * | 3/2012 | Wang | G06F 30/36 716/108 |
| 2012/0124543 | A1 * | 5/2012 | Gunasekar | G06F 30/3312 716/134 |
| 2013/0318488 | A1 * | 11/2013 | Iyer | G06F 30/327 716/108 |

(Continued)

*Primary Examiner* — Phallaka Kik
(74) *Attorney, Agent, or Firm* — Patterson + Sheridan, LLP (57) ABSTRACT

The present disclosure describes systems and methods for scaling timing libraries for circuit design analysis. The method includes applying a first transformation to timing library data for an electric component design to produce first transformed timing library data and applying a second transformation to the timing library data to produce second transformed timing library data. The method also includes, in response to determining that the first transformed timing library data is more linear than the second transformed timing library data: estimating, by a processor, transformed timing data for the electric component design based on the first transformed timing library data and applying an inverse of the first transformation to the estimated transformed timing data to produce estimated timing data for the electric component design.

20 Claims, 8 Drawing Sheets

(56) References Cited

U.S. PATENT DOCUMENTS

2024/0143880 A1* 5/2024 Lin ...................... G06F 30/398

* cited by examiner

LIBRARY SCALING FOR CIRCUIT DESIGN ANALYSIS

TECHNICAL FIELD

The present disclosure relates to an electronic design automation (EDA) system. Specifically, the present disclosure relates to scaling libraries for circuit design analysis.

BACKGROUND

One step of electric circuit design involves evaluating or validating the timing of the circuit design. For example, during this step, the delays in the circuit may be analyzed to determine whether certain signals will arrive at certain points in the circuit by certain times.

SUMMARY

The present disclosure describes systems and methods for scaling timing libraries for circuit design analysis. According to an embodiment, the method includes applying a first transformation to timing library data for an electric component design to produce first transformed timing library data and applying a second transformation to the timing library data to produce second transformed timing library data. The method also includes, in response to determining that the first transformed timing library data is more linear than the second transformed timing library data: estimating, by a processor, transformed timing data for the electric component design based on the first transformed timing library data and applying an inverse of the first transformation to the estimated transformed timing data to produce estimated timing data for the electric component design.

The method may include comparing the estimated timing data to timing library data for the electric component design to determine an accuracy of the estimated timing data.

Estimating the transformed timing data may include determining a function based on the first transformed timing library data. The function may be a non-linear function. The function may be a polynomial function. The method may include receiving an operating condition. The operating condition may include at least one of a voltage, a temperature, or a process. The method may include applying the function to estimate transformed timing data for the operating condition and applying the inverse of the first transformation to the transformed timing data for the operating condition to produce timing data for the operating condition.

Producing the first transformed timing library data further may include applying a third transformation to a first data type in the timing library data. The first transformation and the second transformation may be applied to a second data type in the timing library data different from the first data type.

According to another embodiment, the system includes a memory and a processor communicatively coupled to the memory. The processor applies a first transformation to timing library data for an electric component design to produce first transformed timing library data and applies a second transformation to the timing library data to produce second transformed timing library data. The processor, in response to determining that the first transformed timing library data is more linear than the second transformed timing library data: estimates transformed timing data for the electric component design based on the first transformed timing library data and applies an inverse of the first transformation to the estimated transformed timing data to produce estimated timing data for the electric component design.

The processor may compare the estimated timing data to timing library data for the electric component design to determine an accuracy of the estimated timing data.

Estimating the transformed timing data may include determining a function based on the first transformed timing library data. The function may be a non-linear function. The function may be a polynomial function. The processor may receive an operating condition. The operating condition may include at least one of a voltage, a temperature, or a process. The processor apply the function to estimate transformed timing data for the operating condition and apply the inverse of the first transformation to the transformed timing data for the operating condition to produce timing data for the operating condition.

Producing the first transformed timing library data may include applying a third transformation to a first data type in the timing library data. The first transformation and the second transformation may be applied to a second data type in the timing library data different from the first data type.

According to another embodiment, a non-transitory computer readable medium stores instructions for scaling timing libraries. The instructions, when executed by a processor, cause the processor to apply a plurality of transformations to timing library data for an electric component design to produce a plurality of sets of transformed timing data and determine a set of transformed timing data of the plurality of sets of transformed timing data that is most linear. The processor also estimates transformed timing data for the electric component design based on the set of transformed timing data and applies, to the estimated transformed timing data, an inverse of the transformation of the plurality of transformations that produced the set of transformed timing data to produce estimated timing data for the electric component design.

The processor may compare the estimated timing data to timing library data for the electric component design to determine an accuracy of the estimated timing data.

Estimating the transformed timing data may include determining a function based on the set of transformed timing data. The function may be a non-linear function. The function may be a polynomial function. The processor may receive an operating condition. The operating condition may include at least one of a voltage, a temperature, or a process. The processor may apply the function to estimate transformed timing data for the operating condition and apply the inverse of the transformation to the transformed timing data for the operating condition to produce timing data for the operating condition.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to library scaling for circuit design analysis. During electric circuit design, static timing analysis may be performed to determine whether the circuit design meets certain timing requirements. This timing analysis may involve referencing timing libraries with timing data for different components of the circuit design to determine how these components impact timing in the circuit design. Each component may have multiple timing libraries with timing data for different operating conditions (e.g., different operating voltages or temperatures or process corners).

Challenges may arise when a component does not have a timing library for a particular operating condition. For example, there may be timing libraries for two or more available or different operating conditions, but there may be no timing library for another operating condition, such as voltage. If timing analysis needs to be performed for the missing operating condition, then library scaling may need to be performed. During library scaling, the timing data for the missing operating condition may be interpolated using the timing data from the timing libraries for the two or more available operating conditions. The accuracy of the interpolated timing data, however, may be low, especially when the voltage or timing data gap between these available operating conditions is large.

The present disclosure describes a system that may improve the accuracy of library scaling. Generally, the system applies various transformations to the timing data in existing timing libraries to determine which transformations make the timing data in the timing libraries more linear. The system may determine the transformations that produce the most linear transformed timing data, and the system may determine a function that best fits the transformed timing data. The system may then use the function to estimate transformed timing data for a missing library. The system may apply the inverse transformations on the transformed timing data for the missing library to produce the timing data for the missing library.

The present system may provide several technical advantages. For example, because the present system transforms the timing data in the existing libraries to be more linear, the function (which may be an interpolation) determined using the transformed timing data may more accurately reflect the performance of the circuit design. As a result, static timing analysis performed by a processing device using the timing data for the missing library may be more accurate. Additionally, the process of transforming existing libraries and subsequently performing the inverse transform to produce the scaling results may be a one-time process, which reduces runtime overhead. As another example, the present system may improve the speed or other performance of a computer performing the static timing analysis. A processor and memory of the computer may store and analyze fewer timing libraries to perform timing analysis, which improves processor runtime and memory usage. Moreover, the scaling results may be stored and retrieved from cache so that the processor and memory need not perform an additional interpolation during runtime, which further reduces processor runtime and memory usage.

Figure 1:
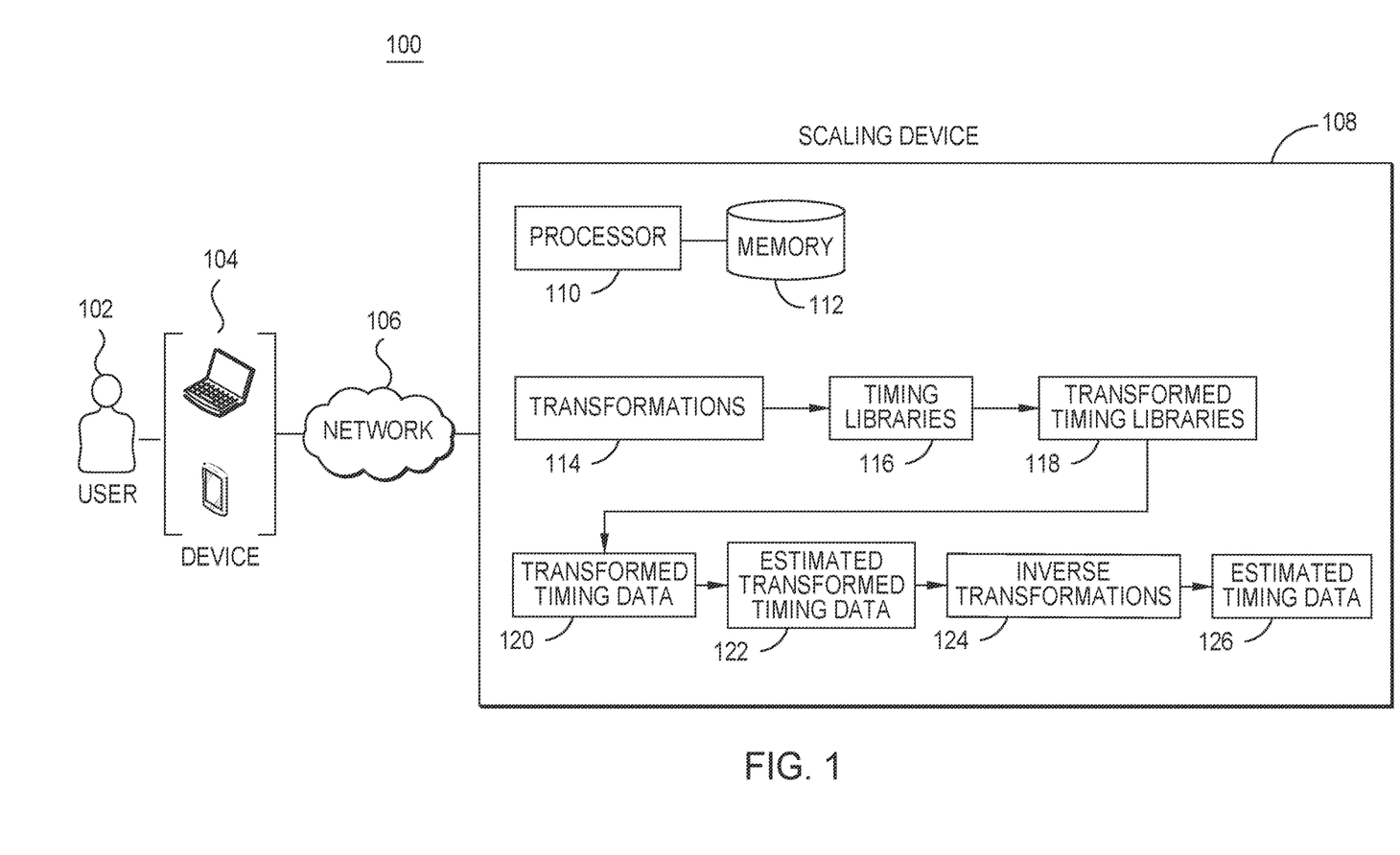
FIG. 1 illustrates an example system.

FIG. 1 illustrates an example system 100. As seen in FIG. 1, the system 100 includes one or more devices 104, a network 106, and a scaling device 108. Generally, the system 100 performs library scaling so that timing analysis may be performed for an electric circuit design. In particular embodiments, the system 100 improves the accuracy of scaled libraries by transforming the timing data in existing timing libraries to be more linear.

A user 102 may use the device 104 to initiate library scaling or timing analysis. For example, the user 102 may use the device 104 to instruct the scaling device 108 to begin library scaling or timing analysis. After library scaling is complete, the user 102 may provide an operating condition to the scaling device 108. For example, the user 102 may provide an operating voltage or an operating temperature to the scaling device 108. The scaling device 108 may use the scaled libraries to determining timing data for the provided operating condition. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The network 106 is any suitable network operable to facilitate communication between the components of the system 100.

The scaling device 108 performs library scaling to estimate timing data for electric components when a timing library for the electric component under a particular operating condition is not available. The scaling device 108 may be a computer system (e.g., the computer system 900 shown in FIG. 9). As seen in FIG. 1, the scaling device 108 includes a processor 110 and a memory 112 that may perform the functions or actions of the scaling device 108 described herein. The processor 110 and the memory 112 may be the processing device 902 and the memory 904 of the computer system 900 shown in FIG. 9.

As discussed above, the scaling device 108 may receive an electric circuit design that includes one or more electric circuit components from the device 104. The scaling device 108 may also receive one or more operating conditions from the device 104. The scaling device 108 may evaluate whether there are timing libraries for the electric components under the specified operating conditions. If the scaling device 108 determines that the timing libraries for the electric components under the specified operating conditions do not exist, then the scaling device 108 may perform library scaling to generate timing data for the electric components under the specified operating conditions.

The scaling device 108 may begin by applying one or more transformations 114 to the timing data in existing timing libraries 116 for the electric components to produce transformed timing libraries 118. The transformations 114 may be mathematical functions that are applied to the timing data in the existing timing libraries 116. For example, the transformations 114 may include the natural log function (ln(x)), the cubed root function (x^(⅓)), the fifth root function ($x^\wedge(1/5)$), etc. In some instances, the transformations 114 may be predefined for the scaling device 108. In some embodiments, the scaling device 108 may build or generate some of the transformations 114 using the timing data in the existing timing libraries 116. For example, the scaling device 108 may analyze the timing data in the existing timing libraries 116 to build a transformation 114 that, when applied to the timing data, may make the timing data more linear.

The timing data in the timing libraries 116 may include data for certain timing characteristics for electric components at different operating conditions. For example, the timing data may include slew rates or delays for an electric component at different operating voltages or temperatures. The scaling device 108 may apply a different transformation 114 to each of the different characteristics (which may also be referred to as data types). For example, the scaling device 108 may apply a first transformation to a slew rate data type in the timing libraries 116 and a second transformation to a delay data type in the timing libraries 116.

The scaling device 108 may determine the transformation 114 or transformations 114 that, when applied to the data types in the existing timing libraries 116, make the timing data in the existing timing libraries 116 the most linear (e.g., based on linear fitting). The scaling device 108 may evaluate the timing data that results from applying the transformations 114 to the data types in the existing timing libraries 116 to determine which transformation 114 makes the timing data for each data type the most linear. The scaling device 108 may then use the transformed timing libraries 118 produced by applying the transformations 114 to the existing timing libraries 116. In some embodiments, by using the most linear timing data in the transformed timing libraries 118, the scaling device 108 may improve the accuracy of the library scaling process.

The transformed timing libraries 118 may include the transformed timing data 120. The transformed timing data 120 may be produced by applying the transformations 114 to the timing data of the different data types in the existing timing libraries 116. As discussed previously, the scaling device 108 may select the transformed timing data 120 that is the most linear relative to the transformed timing data 120 produced by applying other transformations 114 to the timing data in the existing timing libraries 116. The scaling device 108 may use the transformed timing data 120 to perform library scaling.

The scaling device 108 may estimate transformed timing data for specified operating conditions using the transformed timing data 120. As seen in FIG. 1, the scaling device 108 produces estimated transformed timing data 122 using the transformed timing data 120. In some embodiments, to produce the estimated transformed timing data 122, the scaling device 108 determines a non-linear scaling function that most closely approximates the transformed timing data 120. For example, the scaling device 108 may determine a polynomial function that approximates the transformed timing data 120. The polynomial function may be of any suitable order. If the transformed timing data 120 includes datapoints for two values of an operating condition, then the scaling device 108 may approximate the transformed timing data 120 using a first order polynomial. If the transformed timing data 120 includes datapoints for three values of an operating condition, then the scaling device 108 may use a second order polynomial to approximate the transformed timing data 120. If the transformed timing data 120 includes datapoints for four values of an operating condition, then the scaling device 108 may use a third order polynomial to approximate the transformed timing data 120. The scaling device 108 may determine coefficients for the polynomial function so that the polynomial function approximates the transformed timing data 120. The scaling device 108 may then use the function to produce the estimated transformed timing data 122 for any suitable operating condition. Although, we described the production of estimated transformed timing data 122 using polynomial functions, the non-linear scaling can be achieved by other methods as well.

After producing the estimated transformed timing data 122, the scaling device 108 applies one or more inverse transformations 124 to the estimated transformed timing data 122 to produce estimated timing data 126. The inverse transformations 124 may be the inverse of the transformations 114 that were applied to the data types in the timing libraries 116 to produce the transformed timing libraries 118. As discussed previously, the transformations 114 may have been the transformations 114 that made the timing data in the timing libraries 116 the most linear. By applying the inverse transformations 124 to the estimated transformed timing data 122, the scaling device 108 reverses the effect of applying the transformations 114. The scaling device 108 may then use the estimated timing data 126 for the electric component in the circuit design. The estimated timing data 126 may be treated as timing data for the electric component under the specified operating conditions for which no timing library 116 existed. In this manner, the scaling device 108 performs library scaling to generate estimated timing data 126 that is more accurate relative to other library scaling techniques that do not apply the transformations 114 to the timing libraries 116, in certain embodiments.

Figure 2:
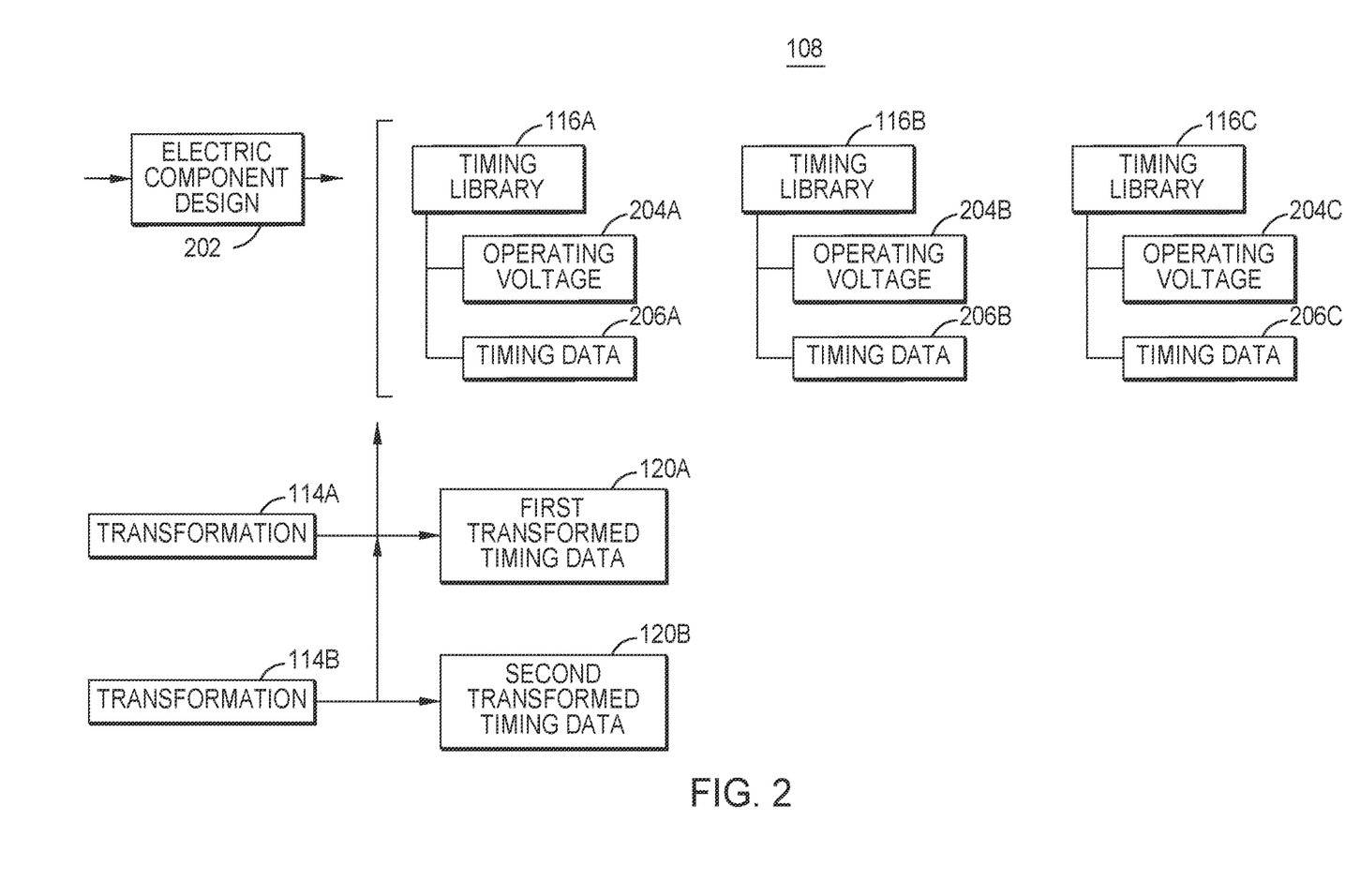
FIG. 2 illustrates an example scaling device in the system of FIG. 1 transforming timing data.

FIG. 2 illustrates an example scaling device 108 in the system 100 of FIG. 1. Generally, FIG. 2 shows the scaling device 108 transforming timing data. A scaling device 108 may transform timing data using multiple transformations 114 to determine which transformations 114 makes the timing data for different data types in timing libraries 116 the most linear.

The scaling device 108 receives an electric component design 202 from the device 104. The electric component in the design 202 may be part of an electric circuit design provided by the device 104. The device 104 may also specify an operating condition such as an operating voltage or an operating temperature.

The scaling device 108 may retrieve the timing libraries 116 for the electric component design 202. In the example of FIG. 2, the scaling device 108 retrieves three existing timing libraries 116A, 116B, and 116C for the electric component design 202. Each of the timing libraries 116A, 116B, and 116C includes a corresponding operating condition and timing data. In the example of FIG. 2, each of the timing libraries 116 includes an operating voltage 204 and timing data 206 (which may also be referred to as timing library data 206). The timing library 116A includes the operating voltage 204A and timing data 206A. The timing library 116B includes the operating voltage 204B and timing data 206B. The timing library 116C includes the operating voltage 204C and timing data 206C. The timing data 206 may be any suitable timing characteristic for the electric component under the operating voltage 204. For example, the timing data 206 may indicate a slew rate and/or a delay for the electric component design 202 under the operating voltage 204 for the timing data 206.

The scaling device 108 may determine that library scaling is appropriate when the timing libraries 116 for the electric component design 202 do not include an operating condition that matches the operating condition specified by the device 104. For example, the scaling device 108 may determine that library scaling is appropriate when the device 104 specifies an operating voltage that does not match or fall within a threshold range of any of the operating voltages 204A, 204B, and 204C. Stated differently, the scaling device 108 may determine that library scaling is appropriate when the scaling device 108 determines that there is no timing library 116 for the operating condition specified by the device 104.

To perform library scaling, the scaling device 108 may first determine a suitable transformation 114 and a suitable non-linear scaling function for the electric component design 202. The scaling device 108 may begin by applying multiple transformations 114 to one or more of the timing libraries 116. In some embodiments, the scaling device 108 may refrain from applying the transformations 114 to one or more of the timing libraries 116. Instead, the scaling device 108 may reserve or hold these timing libraries 116 for verification purposes. In the example of FIG. 2, the scaling device 108 may reserve or hold the timing library 116C for verification purposes. Verification may be performed using the timing library 116C after library scaling is performed. For example, the scaling device 108 may use the transformation 114 and the scaling function to produce a timing library for the operating voltage 204C specified in the timing library 116C. The scaling device 108 may then compare the timing data in the produced timing library with the timing data 206C in the timing library 116C to verify the accuracy or correctness of the transformation 114 and the scaling function. The scaling device 108 may apply the multiple transformations 114 to the timing libraries 116A and 116B. In the example of FIG. 2, the scaling device 108 applies the transformations 114A and 114B to the timing libraries 116A and 116B.

As discussed previously, the transformations 114 may be mathematical functions that are applied to the timing data 206 of timing libraries 116. For example, the transformations 114 may include the natural log function (ln(x)), the cubed root function ($x^{(1/3)}$), the fifth root function ($x^{(1/5)}$), etc. Additionally, in some embodiments, the scaling device 108 may build its own functions or transformations 114 to apply to the timing data 206. The scaling device 108 may then determine which transformation 114 makes the timing data 206 in the timing libraries 116 the most linear. In some embodiments, if the timing data 206 includes multiple data types, then the scaling device 108 may determine a suitable transformation for each data type.

In the example of FIG. 2, the scaling device 108 applies the transformations 114A and 114B to the timing data 206A and 206B to produce transformed timing data 120 (which may also be referred to as transformed timing library data 120). When the scaling device 108 applies the transformation 114A to the timing data 206A and 206B, the scaling device 108 produces first transformed timing data 120A. When the scaling device 108 applies the transformation 114B to the timing data 206A and 206B, the scaling device 108 produces second transformed timing data 120B. For example, if the transformation 114A is the natural log function (ln(x)), then the first transformed timing data 120A may be the natural log of the timing data 206A and 206B. If the transformation 114B is the cubed root function ($x^{(1/3)}$), then the second transformed timing data 120B may be the cubed root of the timing data 206A and 206B. The transformed timing data 120A and 120B may be more linear relative to the timing data 206A and 206B. In instances where the timing data 206A and 206B include multiple data types (e.g., delays, slew rates, etc.), the scaling device 108 may apply different transformations to the different data types to generate the transformed timing data for each data type. For clarity and to simplify the example, the timing data 206 in the example of FIG. 2 includes only one data type.

Figure 3:
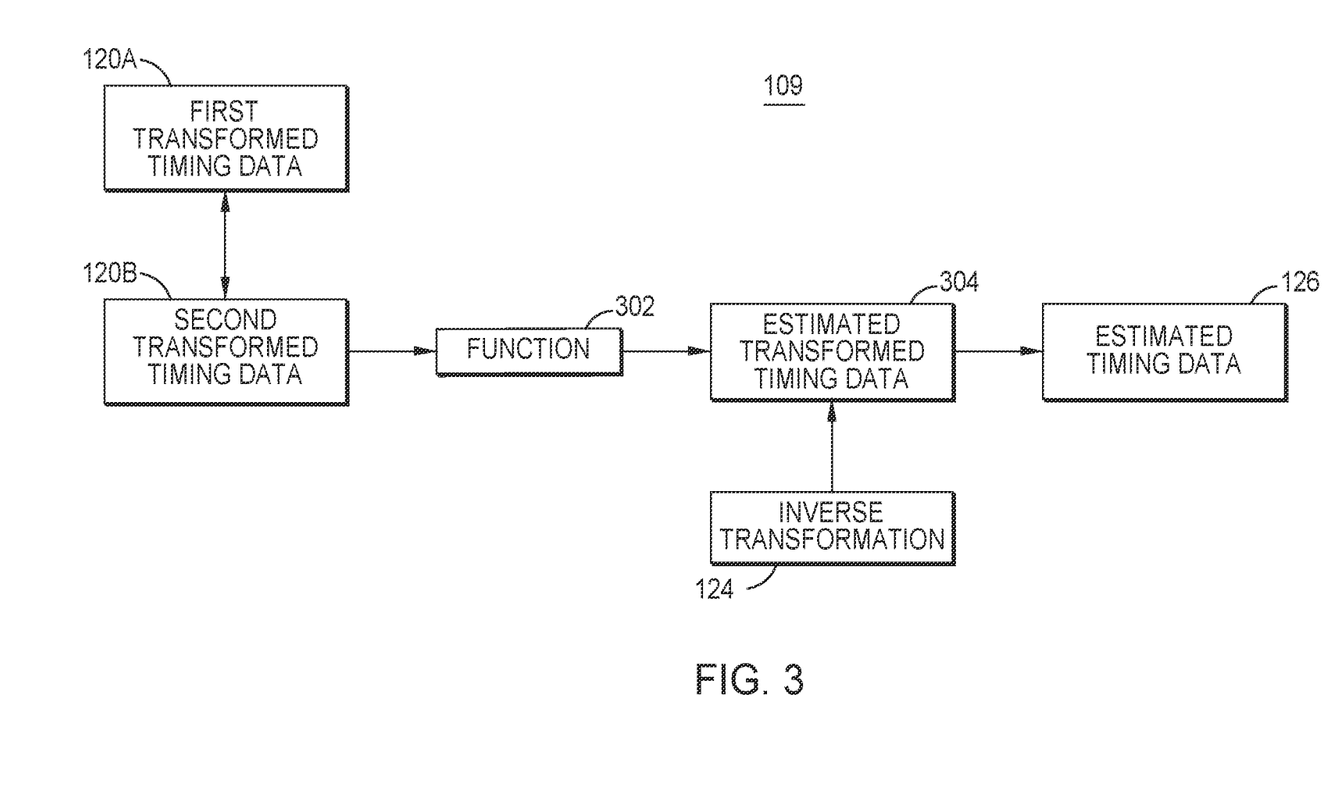
FIG. 3 illustrates an example scaling device in the system of FIG. 1 estimating timing data.

FIG. 3 illustrates an example scaling device 108 in the system 100 of FIG. 1. Generally, FIG. 3 shows the scaling device 108 estimating timing data for an operating condition. The scaling device 108 may estimate the timing data by determining a mathematical function that approximates the transformed timing data 120.

The scaling device 108 analyzes the transformed timing data 120 produced by applying the transformations 114 to the timing data 206 to determine which transformation 114 produces the most linear transformed timing data 120. The scaling device 108 may determine which transformed timing data 120 is more linear using any suitable technique. For example, the scaling device 108 may perform a linear regression on each transformed timing data 120 and then calculate the least square error for each transformed timing data 120. The scaling device 108 may determine that the transformed timing data 120 with the smallest least square error is the most linear. In the example of FIG. 3, the scaling device 108 compares the first transformed timing data 120A to the second transformed timing data 120B to determine which of the transformed timing data 120A or 120B is more linear. The scaling device 108 may determine that the second transformed timing data 120B is more linear than the first transformed timing data 120A. In response, the scaling device 108 may proceed with the second transformed timing data 120B.

The scaling device 108 may determine a mathematical function 302 that approximates the second transformed timing data 120B. The function 302 may be a nonlinear function 302 (e.g., a polynomial function). The scaling device 108 may use any suitable functions 302 to approximate the second transformed timing data 120B. If the scaling device 108 uses a polynomial function to approximate the second transformed timing data 120B, then the scaling device 108 may determine the order of the polynomial function and the coefficients for the polynomial function, so that the polynomial function approximates the second transformed timing data 120B. For example, if the second transformed timing data 120B includes datapoints for two values of an operating condition, then the scaling device 108 may use a first order polynomial function to approximate the second transformed timing data 120B. If the second transformed timing data 120B includes datapoints for three values of an operating condition, then the scaling device 108 may use a second order polynomial, to approximate the second transformed timing data 120B. After determining the order of the polynomial function, the scaling device 108 may determine the coefficients to be used in the polynomial function, so that the polynomial function approximates the second transformed timing data 120B. As a result, the function 302 expresses the values of the datapoints as functions of the values of the operating condition.

As an example, if the second transformed timing data 120B includes datapoints for two values of an operating voltage, then the scaling device 108 may determine a function 302 that is a first order polynomial $v=au+b$, where a and b are the coefficients for the function 302, u is the value of the operating voltage, and v is the value of the datapoints. If the second transformed timing data 120B includes datapoints for three values of an operating voltage, then the scaling device 108 may determine a function 302 that is a second order polynomial $v=au^2+bu+c$, where a, b, and c are the coefficients for the function 302, u is the value of the operating voltage, and v is the value of the datapoints. If the second transformed timing data 120B includes datapoints for four values of an operating voltage, then the scaling device 108 may determine a function 302 that is a third order polynomial $v=au^3+bu^2+cu+d$, where a, b, c, and d are the coefficients for the function 302, u is the value of the operating voltage, and v is the value of the datapoints.

After determining the function 302, the scaling device 108 may use the function 302 to estimate timing data. In some embodiments, the scaling device 108 may first estimate timing data for timing libraries 116 that were reserved or held for verification purposes. In the example of FIG. 3, the scaling device 108 may input the operating voltage 204C for the timing library 116C, which was reserved for verification purposes, to the function 302 to produce the estimated transformed timing data 304. The estimated transformed timing data 304 may be the output of the function 302 when the operating voltage 204C is input into the function 302.

The scaling device 108 then applies the inverse transformation 124 to the estimated transformed timing data 304 to produce the estimated timing data 126. The inverse transformation 124 may be the inverse of the transformation 114B. For example, if the transformation 114B is the natural log function (ln(x)), then the inverse transformation 124 may be the exponential function (e^x). As another example, if the transformation 114B is the cubed root function (x^(⅓)), then the inverse transformation 124 may be the cubed function (x^3). By applying the inverse transformation 124 to the estimated transformed timing data 304, the scaling device 108 may reverse the effect of the transformation 114B. When verifying the function 302, the scaling device 108 may compare the estimated timing data 126 to the timing data 206C in the timing library 116C. If the estimated timing data 126 is sufficiently close to the timing data 206C (e.g., as defined by a threshold), then the scaling device 108 may consider the transformation 114B and the function 302 suitable for the electric component design 202. The scaling device 108 may then use the function 302 and the inverse transformation 124 to scale the timing libraries for any suitable operating voltage 204.

Figure 4:
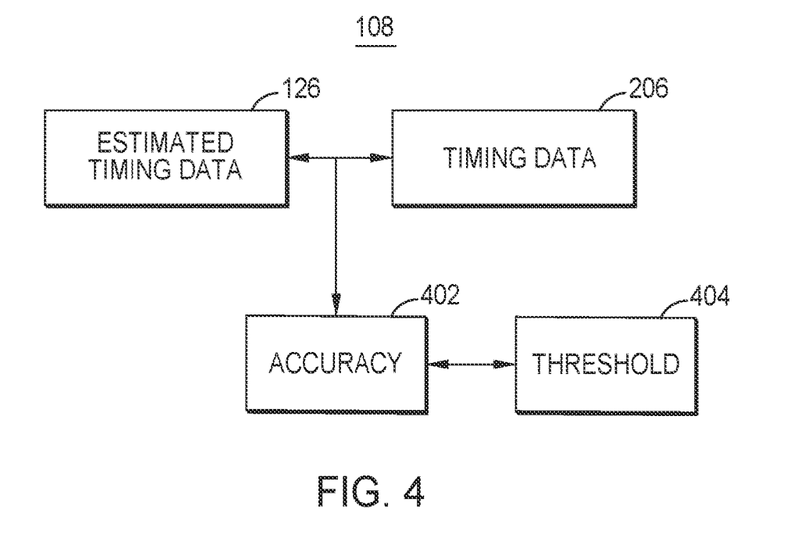
FIG. 4 illustrates an example scaling device in the system of FIG. 1 verifying estimated timing data.

FIG. 4 illustrates an example scaling device 108 in the system 100 of FIG. 1. Generally, FIG. 4 shows the scaling device 108 verifying the estimated timing data 126.

The scaling device 108 may verify the estimated timing data 126 by comparing the estimated timing data 126 to the timing data 206 in timing libraries 116 that were held or reserved for verification purposes. Using the previous example, the scaling device 108 may compare the estimated timing data 126 to the timing data 206C from the timing library 116C, which was held or reserved for verification purposes. The scaling device 108 may have generated the estimated timing data 126 by inputting the operating voltage 204C from the timing library 116C into the function 302. The scaling device 108 may determine the difference between the estimated timing data 126 and the timing data 206 to determine how much the estimated timing data 126 deviates from the timing data 206. This deviation may represent the accuracy 402 of the estimated timing data 126. The smaller the deviation between the estimated timing data 126 and the timing data 206, the higher the accuracy 402.

The scaling device 108 may compare the accuracy 402 with a threshold 404 to determine if the estimated timing data 126 is acceptable. If the accuracy 402 exceeds the threshold 404, then the scaling device 108 may determine that the estimated timing data 126 is acceptable. In response, the scaling device 108 may set the transformation 114B and the function 302 for the electric component 202. If the accuracy 402 does not exceed the threshold 404, the scaling device 408 may determine that the transformation 114B and the function 302 are not sufficient for the electric component 202. In response, the scaling device 108 may repeat the scaling process, using additional transformations 114 to see if a more suitable transformation 114 and function 302 may be found for the electric component 202.

Figure 5:
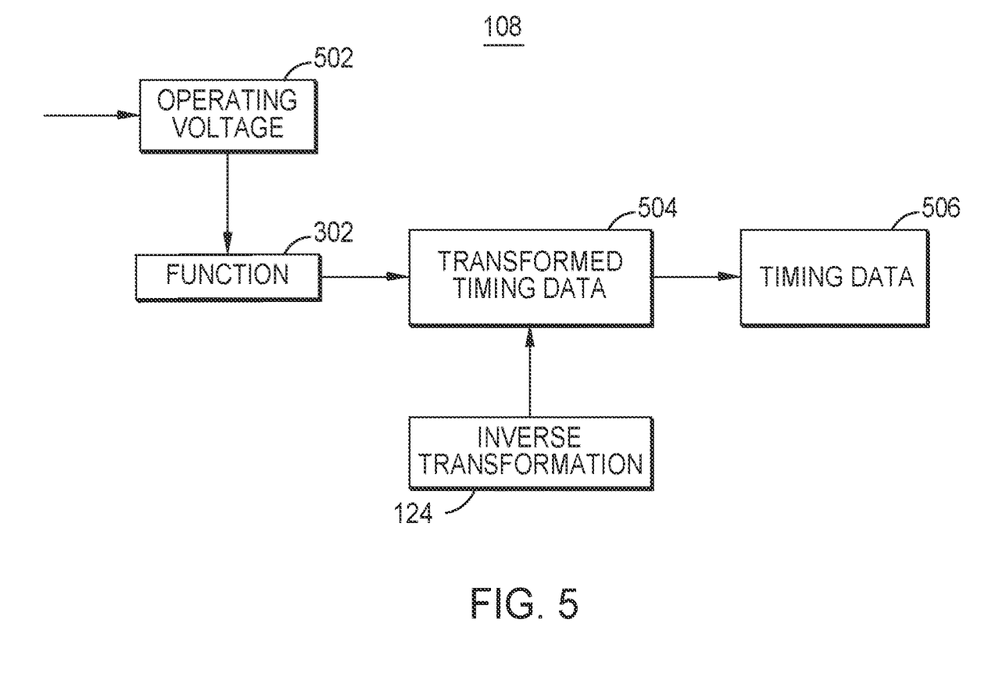
FIG. 5 illustrates an example scaling device in the system of FIG. 1 determining timing data.

FIG. 5 illustrates an example scaling device 108 in the system 100 of FIG. 1. Generally, FIG. 5 shows the scaling device 108 determining timing data.

After the scaling device 108 has determined a suitable transformation 114 and function 302 for the electric component design 202, the scaling device 108 may use the transformation 114 and the function 302 to determine timing data for a specified operating condition. The scaling device 108 may receive an operating condition from the device 104. In the example of FIG. 5, the scaling device 108 receives an operating voltage 502 from the device 104. The scaling device 108 may not have a timing library for the electric component design 202 under the specified operating voltage 502. In response, the scaling device 108 inputs the specified operating voltage 502 into the function 302 for the electric component design 202. The function 302 may then output transformed timing data 504.

The scaling device 108 applies the inverse transformation 124 to the transformed timing data 504. The inverse transformation 124 may be the inverse of the transformation 114 for the electric component design 202. By applying the inverse transformation 124 to the transformed timing data 504, the scaling device 108 produces timing data 506. The timing data 506 may be the timing data 506 that is used for the electric component design 202 under the specified operating voltage 502.

The scaling device 108 or another device in the system 100 may perform timing analysis (e.g., static timing analysis) for the electric component design 202, or an electric circuit design that includes the electric component design 202, using the timing data 506. In this manner, the scaling device 108 provides the timing data 506 for the electric component design 202 under the specified operating voltage 502 even when there is no timing library 116 for the electric component design 202 under the specified operating voltage 502.

Figure 6:
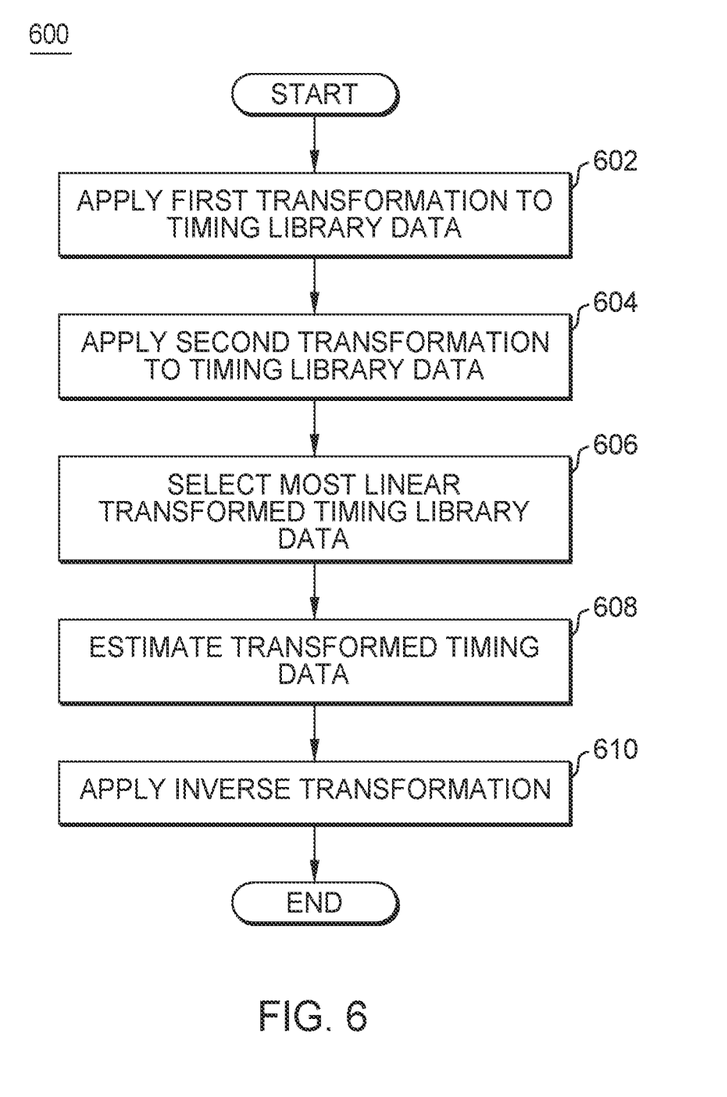
FIG. 6 is a flowchart of an example method performed in the system of FIG. 1.

FIG. 6 is a flowchart of an example method 600 performed in the system 100 of FIG. 1. In particular embodiments, the scaling device 108 performs the method 600. By performing the method 600, the scaling device 108 determines a suitable transformation 114 and function 302 for an electric component design 202.

At 602, the scaling device 108 applies a first transformation 114A to timing library data 206. The timing library data 206 may be included in timing libraries 116 for the electric component design 202. Each of the timing libraries 116 may include timing library data 206 for the electric component design 202 under a different operating voltage 204. The timing library data 206 in each timing library 116 may include timing data of different data types (e.g., slew rate, delay, etc.) As an example, the scaling device 208 may apply the first transformation 114A to the timing library data 206A and 206B in the timing libraries 116A and 116B. By applying the first transformation 114A, the scaling device 108A may produce the first transformed timing data 120A. The first transformation 114A may include multiple transformations, one for each different data type for the timing library data 206A and 206B in the timing libraries 116A and 116B.

At 604, the scaling device 108 applies a second transformation 114B to the timing library data 206 in the timing libraries 116. The second transformation 114B may be different from the first transformation 114A. The second transformation 114B may include multiple transformations, one for each different data type for the timing library data 206A and 206B in the timing libraries 116A and 116B. By applying the transformation 114B to the timing library data 206A and 206B in the timing libraries 116A and 116B, the scaling device 108 may produce the second transformed timing library data 120B.

At 606, the scaling device 108 selects the most linear transformed timing library data 120. For example, the scaling device 108 may compare the first transformed timing library data 120A to the second transformed timing library data 120B resulting from applying the transformations 114A and 114B to the timing library data 206A and 206B. The scaling device 108 may determine which of the transformed timing library data 120A or 120B is more linear.

The scaling device 108 may apply any suitable number of transformations 114 to the timing data 206 from any suitable number of timing libraries 116 to produce any suitable number of sets of transformed timing library data 120. The scaling device 108 may examine the different sets of transformed timing library data 120 to determine which set of transformed timing library data 120 is the most linear. The scaling device 108 may then determine the transformation 114 that produces the more linear set of transformed timing library data 120.

At 608, the scaling device 108 estimates transformed timing data. In certain embodiments, the scaling device 108 estimates transformed timing data by determining the function 302 that approximates the most linear transformed timing library data 120 from 606. The scaling device 108 may determine a non-linear function (e.g., a polynomial function) that approximates the transformed timing library data 120. For example, the scaling device 108 may determine the order of the polynomial function and the coefficients in the polynomial function. The scaling device 108 may input an operating condition (e.g., an operating voltage into the function 302 to produce the estimated transformed timing data 304 for that operating condition.

At 610, the scaling device 108 applies the inverse transformation 124 to the estimated transformed timing data 304 from 608 to produce estimated timing data 126. The inverse transformation 124 may be the inverse of the transformation 114 that produced the transformed timing data 120 at 606. By applying the inverse transformation 124, the scaling device 108 may reverse the effect of applying the transformation 114. In some embodiments, the scaling device 108 may then verify the estimated timing data 126 by comparing the estimated timing data 126 to the timing data 206 from the timing library 116 that was reserved or held for verification purposes.

The scaling device 108 may verify the accuracy of the transformation 114 and the function 302 using information from a timing library 116C that was reserved or held for verification purposes. The scaling device 108 may input an operating condition (e.g., operating voltage 204C) into the function 302 to produce the estimated transformed timing data 304 for that operating condition. The estimated transformed timing data 304 may be the output of the function 302. The scaling device 108 then applies the inverse transformation 124 to the estimated transformed timing data 304 to produce the estimated timing data 126 for the operating condition. The scaling device 108 then compares the estimated timing data 126 to the timing data 206C in the timing library 116C to determine an accuracy of the transformation 114 and the function 302.

In some embodiments, the scaling device 108 determines the difference between the estimated timing data 126 and the timing data 206, which may be indicative of the accuracy 402 of the transformation 114 and the function 302. The smaller the difference, the higher the accuracy. The scaling device 108 may compare the accuracy 402 with the threshold 404 to determine whether to accept the transformation 114 and the function 302. If the accuracy 402 exceeds the threshold 404, then the scaling device 108 sets the transformation 114 and the function 302 for the electric component design 202. In certain embodiments, the scaling device 108 directly compares the difference between the estimated timing data 126 and the timing data 206 to a threshold. If the difference is below the threshold, then the scaling device 108 sets the transformation 114 and the function 302 for the electric component design 202.

Figure 7:
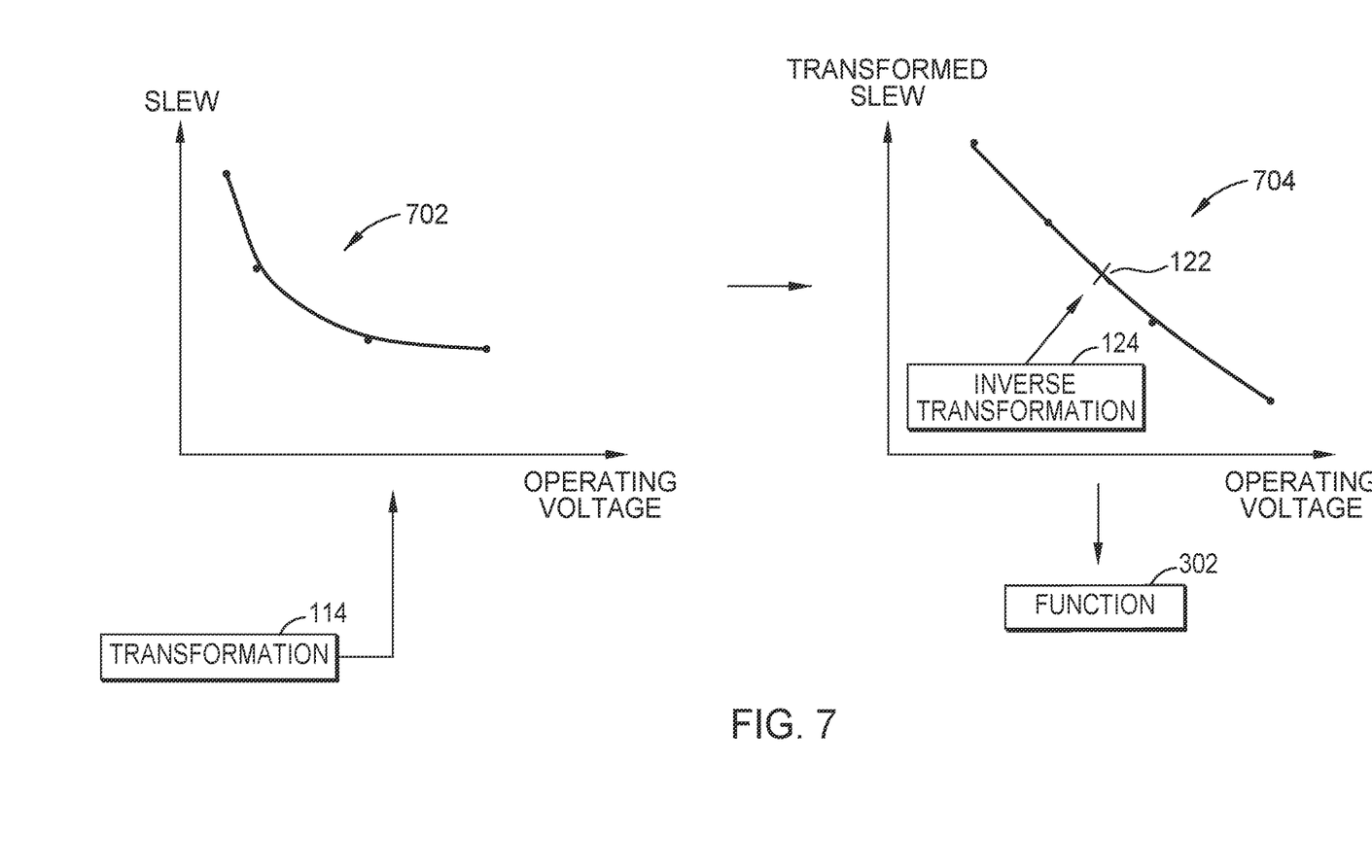
FIG. 7 illustrates an example of transforming timing data.

FIG. 7 illustrates an example of transforming timing data. FIG. 7 includes a plot 702 of various datapoints. Each datapoint represents a slew rate for an electric component at a particular operating voltage. As seen in FIG. 7, the slew rate for the electric component decreases along a curve as the operating voltage increases.

The scaling device 108 may apply a transformation 114 to the slew rates shown in the plot 702 to produce the plot 704. The plot 704 includes datapoints that show the transformed slew rate at the different operating voltages. Generally, the transformed slew rate in the plot 704 is more linear than the slew rate in the plot 702.

The scaling device 108 may determine a function 302 that approximates the transformed slew rate in the plot 704. For example, because the plot 704 includes datapoints for four operating voltages, the scaling device 108 may determine a third order polynomial function as the function 302. Additionally, the scaling device 108 may determine coefficients for the third order polynomial function.

The scaling device 108 may then determine estimated transformed timing data 122 using the function 302. As seen in FIG. 7, the plot 704 does not include a datapoint for the operating voltage at the estimated transformed timing data 122. The scaling device 108 may input the operating voltage into the function 302 to determine the estimated transformed timing data 122. As seen in FIG. 7, the estimated transformed timing data 122 may fall approximately on the line shown in the plot 704.

The scaling device 108 may then apply the inverse transformation 124 to the estimated transformed timing data 122 to produce estimated timing data 126. In the example of FIG. 7, by applying the inverse transformation 124 to the estimated transformed timing data 122, the scaling device 108 may produce an estimated slew rate for the electric component at the specified operating voltage.

Figure 8:
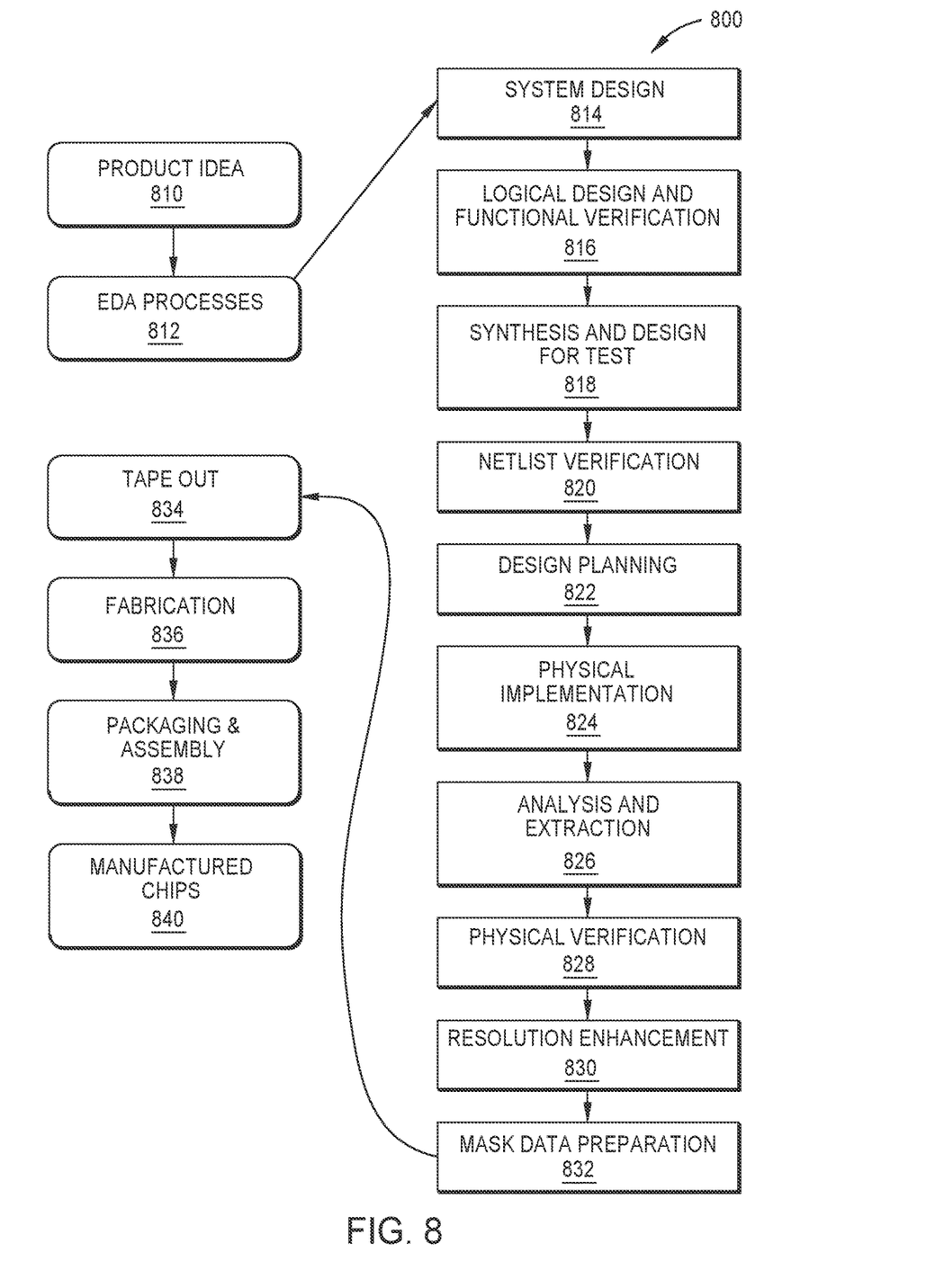
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, which is related to this application, the circuit function is verified at the layout level, which permits refinement of the layout design. During physical verification 828, the layout design is checked to ensure that manufacturing constraints are correct, such as DRC constraints, electrical constraints, lithographic constraints, Timing constraints, and that circuitry function matches the HDL design specification. Static Timing Analysis, which is related to this application, is performed to make sure all timing constraints are satisfied at each design operating condition. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
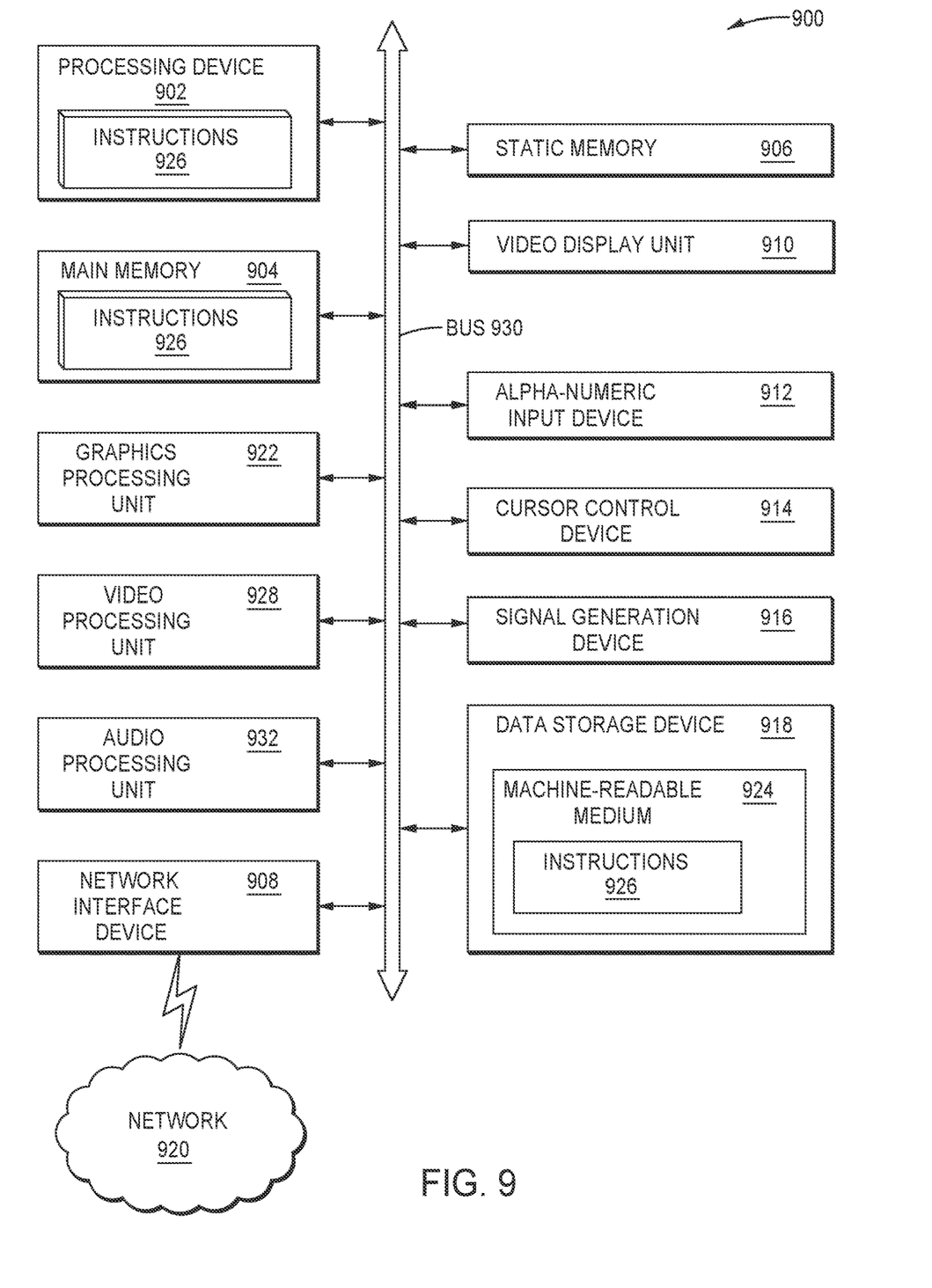
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for scaling timing libraries, the method comprising:
    applying a first transformation to timing library data for an electric component design to produce first transformed timing library data;
    applying a second transformation to the timing library data to produce second transformed timing library data; and in response to determining that the first transformed timing library data is more linear than the second transformed timing library data:
  estimating, by a processor, transformed timing data for the electric component design based on the first transformed timing library data; and
  applying an inverse of the first transformation to the estimated transformed timing data to produce estimated timing data for the electric component design.

2. The method of claim 1, further comprising comparing the estimated timing data to timing library data for the electric component design to determine an accuracy of the estimated timing data.

3. The method of claim 1, wherein estimating the transformed timing data comprises determining a function based on the first transformed timing library data.

4. The method of claim 3, wherein the function is a non-linear function.

5. The method of claim 3, wherein the function is a polynomial function.

6. The method of claim 3, further comprising:
  receiving an operating condition, wherein the operating condition includes at least one of a voltage, a temperature, or a process;
  applying the function to estimate transformed timing data for the operating condition; and
  applying the inverse of the first transformation to the transformed timing data for the operating condition to produce timing data for the operating condition.

7. The method of claim 1, wherein producing the first transformed timing library data further comprises applying a third transformation to a first data type in the timing library data, wherein the first transformation and the second transformation are applied to a second data type in the timing library data different from the first data type.

8. A system for scaling timing libraries, the system comprising:
  a memory; and
  a processor communicatively coupled to the memory, the processor configured to:
    apply a first transformation to timing library data for an electric component design to produce first transformed timing library data;
    apply a second transformation to the timing library data to produce second transformed timing library data; and
    in response to determining that the first transformed timing library data is more linear than the second transformed timing library data:
      estimate transformed timing data for the electric component design based on the first transformed timing library data; and
      apply an inverse of the first transformation to the estimated transformed timing data to produce estimated timing data for the electric component design.

9. The system of claim 8, wherein the processor is further configured to compare the estimated timing data to timing library data for the electric component design to determine an accuracy of the estimated timing data.

10. The system of claim 8, wherein estimating the transformed timing data comprises determining a function based on the first transformed timing library data.

11. The system of claim 10, wherein the function is a non-linear function.

12. The system of claim 10, wherein the function is a polynomial function.

13. The system of claim 10, wherein the processor is further configured to:
  receive an operating condition, wherein the operating condition includes at least one of a voltage, a temperature, or a process;
  apply the function to estimate transformed timing data for the operating condition; and
  apply the inverse of the first transformation to the transformed timing data for the operating condition to produce timing data for the operating condition.

14. The system of claim 8, wherein producing the first transformed timing library data further comprises applying a third transformation to a first data type in the timing library data, wherein the first transformation and the second transformation are applied to a second data type in the timing library data different from the first data type.

15. A non-transitory computer readable medium storing instructions for scaling timing libraries, wherein the instructions, when executed by a processor, cause the processor to:
  apply a plurality of transformations to timing library data for an electric component design to produce a plurality of sets of transformed timing data;
  determine a set of transformed timing data of the plurality of sets of transformed timing data that is most linear;
  estimate transformed timing data for the electric component design based on the set of transformed timing data; and
  apply, to the estimated transformed timing data, an inverse of the transformation of the plurality of transformations that produced the set of transformed timing data to produce estimated timing data for the electric component design.

16. The medium of claim 15, wherein the processor further compares the estimated timing data to timing library data for the electric component design to determine an accuracy of the estimated timing data.

17. The medium of claim 15, wherein estimating the transformed timing data comprises determining a function based on the set of transformed timing data.

18. The medium of claim 17, wherein the function is a non-linear function.

19. The medium of claim 17, wherein the function is a polynomial function.

20. The medium of claim 17, wherein the processor further:
  receives an operating condition, wherein the operating condition includes at least one of a voltage, a temperature, or a process;
  applies the function to estimate transformed timing data for the operating condition; and
  applies the inverse of the transformation to the transformed timing data for the operating condition to produce timing data for the operating condition.

* * * * *